United States Patent [19]

White

[11] 4,173,772
[45] Nov. 6, 1979

[54] SOLID STATE IMAGE SCANNING SYSTEM FOR PRODUCING A BINARY OUTPUT

[75] Inventor: James M. White, Mahopac, N.Y.

[73] Assignee: International Business Machines Corporation, Armonk, N.Y.

[21] Appl. No.: 866,192

[22] Filed: Dec. 30, 1977

[51] Int. Cl.² .......................... H04N 3/14; H04N 5/14
[52] U.S. Cl. ..................................... 358/213; 358/163; 358/221
[58] Field of Search ......................... 358/213, 163, 221

[56] References Cited

U.S. PATENT DOCUMENTS

4,065,788  12/1977  Meier et al. .......................... 358/166

Primary Examiner—Robert L. Richardson
Attorney, Agent, or Firm—Jack M. Arnold

[57] ABSTRACT

An image scanning system which alternately illuminates a charge transfer device with a focused, then defocused image of a line at a time of a document in order to provide comparison signals for binarization of the image concurrent with cancellation of dark current and sensitivity variations. The system includes focus-defocus, variable optical path length optical elements which are operated at a reduced speed by processing a line array at a time instead of a single picture element at a time in the image. A single charge transfer device chip comprises the scanner array, and includes a simple analog line memory comprised of light responsive elements, shift registers, gates, and a 1-bit comparator to perform the binarization. The charge transfer devices may be comprised of charge coupled devices (CCD) or bucket brigade devices (BBD) building blocks.

3 Claims, 23 Drawing Figures

SOLID STATE IMAGE SCANNING SYSTEM FOR PRODUCING A BINARY OUTPUT

BACKGROUND OF THE INVENTION

In order to binarize an image for output on utilization devices such as bilevel display and printers, or for digital compaction/transmission of such non-coded information, many algorithms are used. These algorithms use a variable threshold determined by an average value of picture elements (pel(s)) close to the picture element for which the current threshold is to be determined. In other words, each individual pel is compared with the neighborhood average of pels which can be obtained by defocusing the image or digitally summing values from surrounding pels. A variety of peturbations have been made on neighborhood threshold techniques, sometimes in response to hardware, or to other limitations. These algorithms have been found to be very useful where edge emphasis is beneficial, for example, in typed documents and line drawings.

Previous devices for generating neighborhood threshold reference levels fall into three categories: (1) devices in which each individual pel in a line is alternately scanned in a focus-defocus fashion by mechanically changing the optical system via a vibrating or rotating mirror, lens, prism, disk or wheel. (2) a flying spot cathode ray tube (CRT) scanner with electronically variable spot size. (3) devices in which data is digitized with an analog-to-digital (A/D) converter with several lines of data being stored, and in which the neighborhood averages are digitally calculated for each pel from the surrounding values of the stored data.

For speeds on the order of $10^6$ pels per second, the scheme set forth in (1) is difficult to realize due to the speed of mechanical motion required for each individual pel scan. The CRT scheme in (2) lacks pancromatic response, reliability, linearity of scan, and has deficient defocus at high speeds. The technique in (3) suffers from the problems associated with high speed multi-bit conversion, the expense and speed of digital line buffers and the many additions required for each output decision.

There are a number of patents dealing with the general concept of image scanning. For example, U.S. Pat. No. 4,012,587 to Ochi et al, discloses a solid state image sensor of the type which employs an interline transfer charge-coupled imaging device, in which the electrodes of the vertical shift registers are enlarged to extend to places which will lie between image pick-up portions aligned in a vertical direction of the device. Each of the image pick-up portions comprises an image sensing area and a transfer gate. Preferably, every other image pick-up portion of a conventional CCD imaging device is removed to provide spacing between the image pick-up portions relative to the vertical direction. U.S. Pat. No. 3,932,775 to Kosonocky discloses an interlaced readout of charge stored in a charge coupled image sensing array. Storage of different charges in CCDs in different time periods is disclosed, with internal combination of charges being stored during prior time periods. U.S. Pat. No. 3,993,897 to Burke et al discloses a solid state imaging apparatus comprised of an array of charge storage devices. Readout of the charges stored in a row of devices is accomplished by obtaining the difference of pairs of signals, one sensed on the row line connecting the selected row of devices and the other of the signals sensed on the row line connecting an adjacent row of devices emptied of stored charge. U.S. Pat. No. 3,937,942 to Bromley et al discloses a 2-dimensional, multichannel optical correlation system which employs a light source to illuminate a mask having a plurality of linearly disposed channels, each of which has recording information defined by variations in opacity along its linear length. The light source is modulated as a function of a well known input signal. A multiple element CCD having its elements arrayed in linearly disposed groups along axis parallel to the linear disposed channels of the illuminated mask, is positioned to receive the light energy transmitted by the illuminated mask for developing a charge within each such element commensurate with photo energy received at its discrete position. U.S. Pat. No. 3,940,602 to Lagnado, discloses a 2-dimensional signal processing imager array using charge transfer concepts. The system simultaneously measures the incident optical signal and performs a linear transformation upon the signal. Two CCD registers are arranged on either side of the photo diode array. The difference between the charge in the two registers is taken at the output in order to provide both positive and negative weight for a data pattern that is to be convolved or correlated.

According to the present invention an optical scanner system is disclosed in which a charge transfer device chip is alternately illuminated a line at a time with a focused, then defocused image in order to provide comparison signals for binarization of the image concurrent with providing cancellation of dark current and sensitivity variations. The focusing and defocusing is achieved by interposing an optical path length changing element in the optical path of the scanned line array which is scanned a line at a time rather than an element at a time in a line, thereby providing a lower operation speed for the optical path length changing element.

None of the above-cited art discloses the interposing of an optical path length changing element in the optical path of a scanned line array for the purpose of alternately focusing and defocusing the scanned image. There is no teaching of operating the path length changing element at a reduced speed by scanning a line of elements at a time, instead of a single element at a time in a line. Further, the cited art does not disclose a scanner array which is comprised of a single charge transfer device chip having a simple analog line memory comprised of light responsive elements, shift registers, and gates, and including a comparator means for performing the binarization of the scanned image. Also, there is no suggestion in the above-cited art of how to cancel dark current and sensitivity variations in a scanner system.

SUMMARY OF THE INVENTION

According to the present invention, method of and apparatus for binarizing a scanned image comprising of n, where n is an integer, lines of elements, is set forth. There is means for scanning a line at a time of elements in said image, including means for alternately focusing and defocusing each scanned line of elements. Each alternately focused and defocused line of elements is compared for providing a binarized signal output indicative of the image.

DETAILED DESCRIPTION OF THE INVENTION

Figure 1:
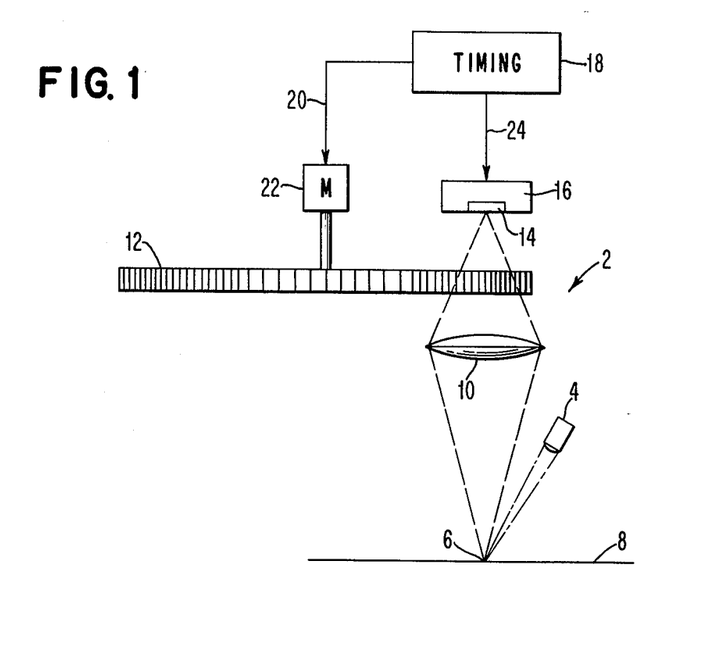
FIG. 1 is a schematic and block diagram representation of an image scanning system according to the present invention.

FIG. 1 illustrates generally at 2 an image scanning system according to the present invention. A source of radiant energy such as a light source 4 illuminates a line 6 of pels at a time on a document 8. The light is reflected from the document 8 and focused through a lens 10 onto an optical path length changing means such as a slotted disk 12 which includes alternate air and transparent dielectric sections, as illustrated more clearly in FIGS. 2A and 2B. Light passed through the slotted disk 12 is imaged onto a line of photo elements 14 on a scanner chip 16, which is an integrated circuit device comprised of charge transfer devices such as CCDs or BBDs. A timing device 18, which for example, may be a clock pulse generator, provides timing pulses via a line 20 to a motor 22 which controls the rotation of the slotted disk 12. Timing pulses are also provided via a line 24 to the scanner chip 16 for controlling the timing sequence thereof. More detailed schematic and block diagram representations are set forth in FIGS. 5–7, and the operation of the device 16 will be described relative thereto.

Figure 2A:
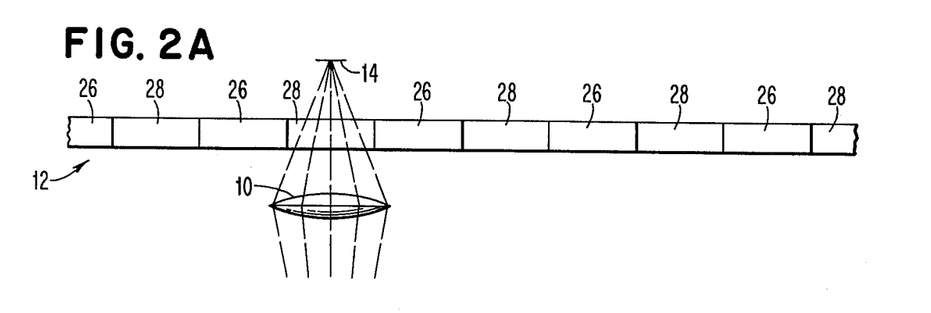
FIGS. 2A and 2B are schematic diagram representations of an optical path length changing means such as a slotted disk.
Figure 2B:
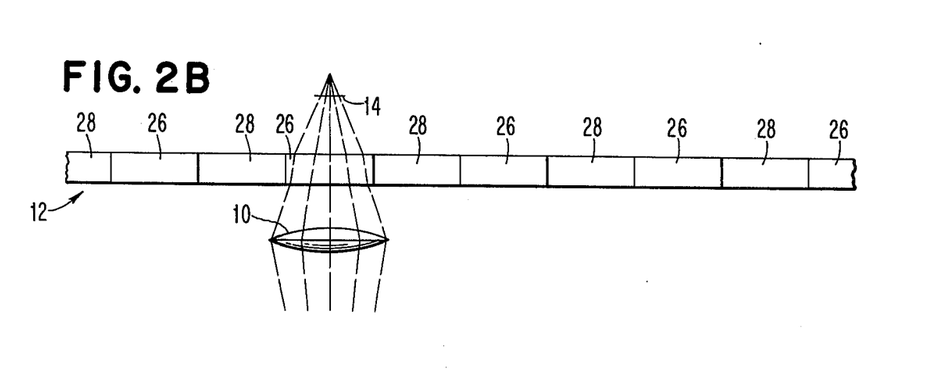

Refer now to FIGS. 2A and 2B which illustrate the positions of the slotted disk 12 relative to the lens 10 when the disk 12 is in a focused and defocused position, respectively. The slotted disk 12 is comprised of transparent dielectric sections 26 and slotted sections 28, which have air as the dielectric medium. The transparent dielectric section 26 may be made of a material such as glass or optical plastic. When, as illustrated in FIG. 2A, light is imaged via the lens 10 through a slotted section 28, the optical path length is not changed since air is the dielectric, and a focused image of the line on the document is provided to the photo elements 14 on the scanner array. When, as illustrated in FIG. 2B, light is imaged from the lens 10 through a transparent dielectric element 26, the dielectric element lengthens the optical path length thereby changing the focal point resulting in a defocused image of the line on the document on the photo elements 14.

Figure 3A:
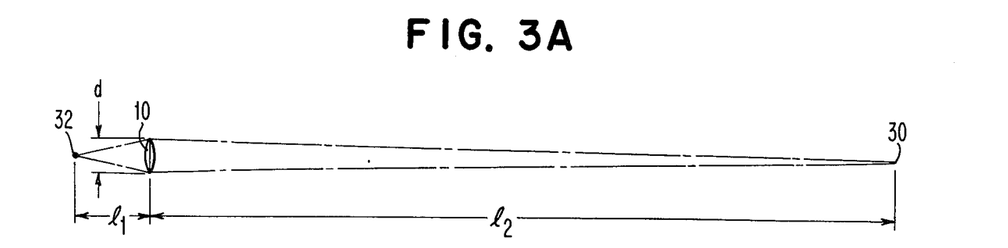
FIGS. 3A–3C are diagrams illustrating how a path length changing element such as a slotted disk achieves the alternate focusing and defocusing of an image.
Figure 3B:
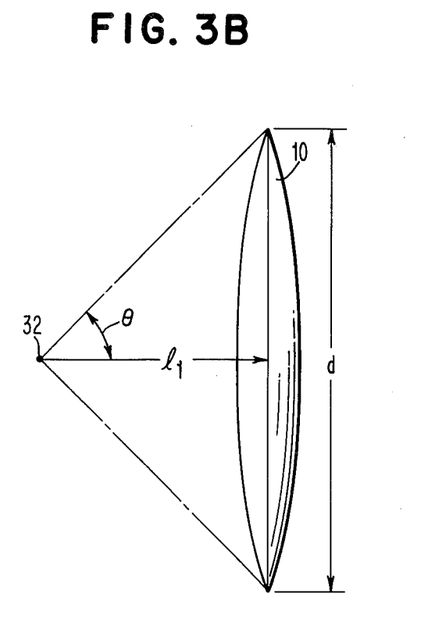
Figure 3C:
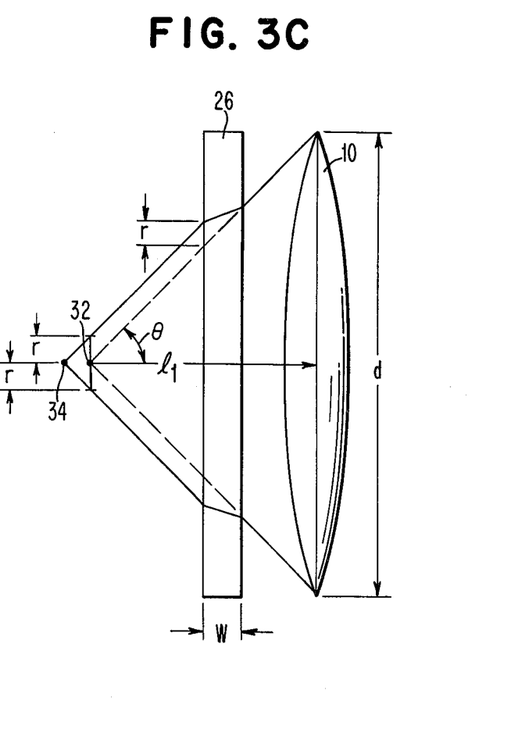

FIG. 3A illustrates how the object point, that is, the point 30 on the diagram, which is a pel on the line 6 on document 8, is imaged a distance $l_2$ through the lens 10, having a diameter d, onto an image point 32 on the line of photo elements 14. The image point 32 is a distance $l_1$ from the focal point of the center of the lens 10. FIG. 3B with an enlarged vertical dimension illustrates how the lens 10 provides a focused image on the image point when the optical path length is not changed, since the light passes through a slotted (air dielectric) section of the slotted disk. In FIG. 3C, a transparent dielectric element 26 of the slotted disk 12 is included, illustrating how the original image point 32 is displaced due to the optical path length being changed, that is, moved to a displaced image point 34, which results in what is termed a blur circle of radius r centered at point 32. That is, the defocused image point 32 now sees a neighborhood of values of the image about the line presently being scanned. In other words, for each element in the line being scanned, the image point 32 is in effect now seeing elements adjacent to each element in the line being scanned. That is, elements in adjacent lines are being sensed at the image point 32 such that a neighborhood average of light intensity for each element may be determined.

The optical path lengths $l_1$ and $l_2$ and the other parameters illustrated in FIGS. 3A–3C are dependent upon the dimensions of the photo element array 14 of the scanner array 16. Scanner arrays with a length on the order of 2000 picture elements (pels) are now commercially available. The length of the optical opening in the defocusing system such as the slots in the disk must accommodate the length of the imager. For a typical imager, i.e., self-scanned photo element array, with a center-to-center sensor element spacing of 12.5 μm the length of a 2000 pel imager is 25 mm or 1 inch. The spacing of the slots around the disk is limited by the angle of the numerical aperture of the lens 10 and the distance of the slotted disk from the photo elements 14. For example, with a numerical aperture of 0.16 and with the slotted disk situated 2 mm from the photo element array, the slots, i.e., the sections having an air dielectric must be greater than 0.64 mm in width, and likewise for the areas between the slots, i.e., the transparent dielectric sections. One might use wider slots and wider areas between slots in order to alleviate the radial positioning tolerances of the disk. Simple geometrical calculations provide the relationships between required speed of rotation, number of slots around the disk perimeter, and the radius of the disk and line scan rate.

As an numerical example of the optical path parameters for the slotted disk system illustrated in FIGS. 1 and 2, the diagram of FIGS. 3A–3C may be utilized. If a 10× reduction from object size to image size is assumed, pels on the document spaced 0.125 mm become pels on the scanner array photo elements spaced 12.5 μm. A lens with an f number of 2.8, and a focal length $f_1$ of 5 mm is assumed. The effective diameter d of the lens is calculated from the f number (2.8) and the focal length as follows:

$$d = f_1/2.8 = 17.9 \text{ mm} \qquad (1)$$

The image distance $l_1$ and the object distance $l_2$ can be determined from the magnification as follows:

$$l_2 = 10 \times l_1 \qquad (2)$$

and the focal length equation is:

$$f_1^{-1} = l_1^{-1} + l_2^{-1} \qquad (3)$$

which results in $l_1=55$ mm and $\theta=\arctan(d/2l_1)=0.16$ radians.

For an index of refraction $n=1.45$ and defocused blur circle of 2.5 pel radius ($r=31.3$ $\mu$m), the thickness of the plate is $w=630$ $\mu$m or 0.025 inch. The size of the blur circle is selected for a given application; for the given example, a visually pleasing result on test documents is produced for a facsimile application. This depends on the characteristics of the human eye and its resolution limits. The blur circle diameter determines the width of the black/white (B/W) edge transitions that appear on the output document.

For long arrays such as a 2000 pel device, the optical plate needs to be replaced by a curved plate (cylindrical lens section) in order to maintain fixed magnification of the image as it is defocused.

Figure 4:
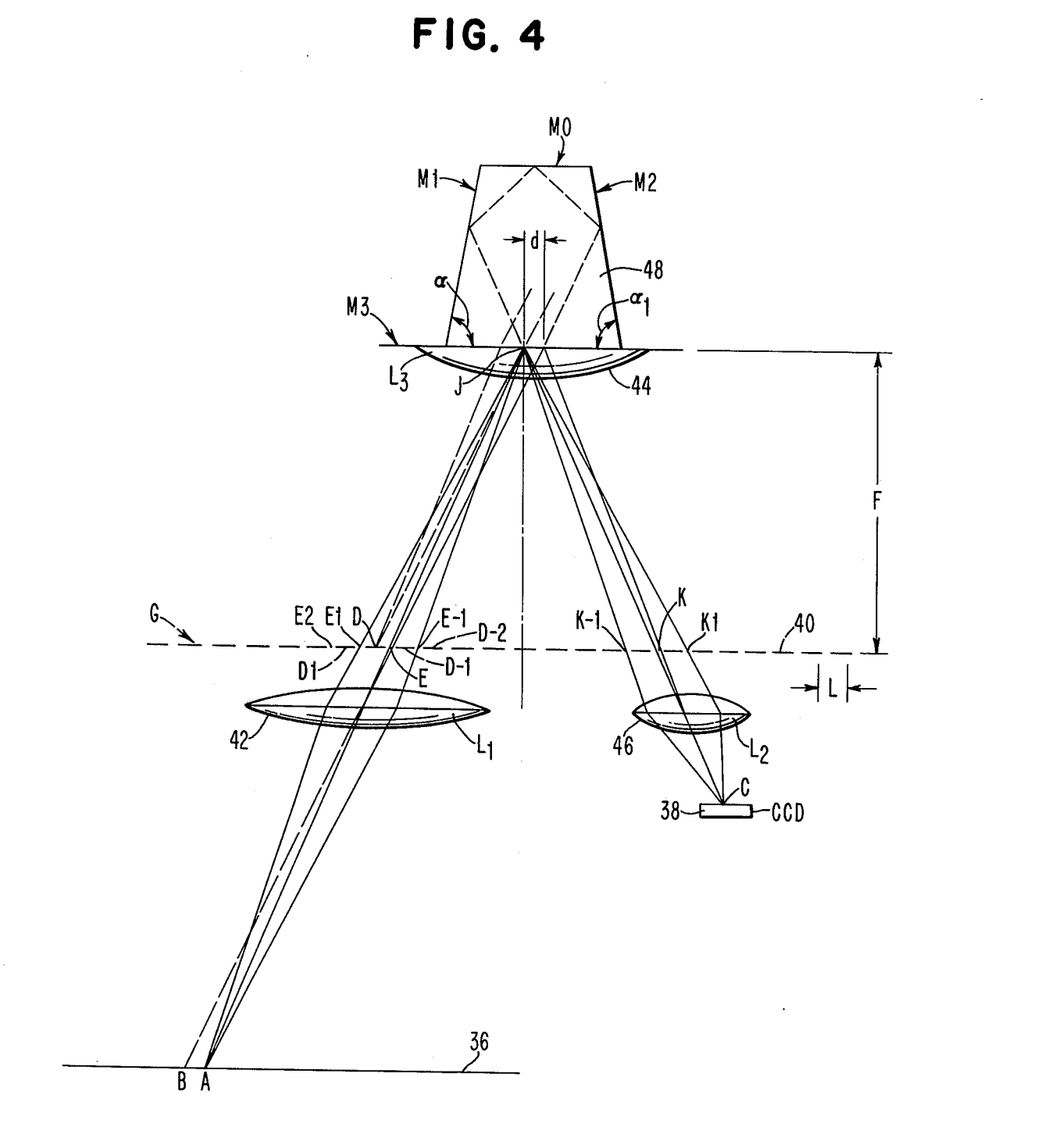
FIG. 4 is a schematic diagram representation of a path length changing device including a graticule.

FIG. 4 illustrates an alternative way of changing the optical path length between the document and the scanner device. An optical system provides alternate focused-defocused images of a line A on a document 36 to an array of photo elements, line C on the scanner chip 38. In other words, a focused version of line A is scanned by the scanner 38, then a defocused image is applied to the scanner array. The defocused version, as is to be explained shortly, is delayed and is compared with the focused version and binarized on an element-by-element basis per line.

The system includes a graticule 40, with the document 36 and the graticule 40 being fixed with respect to each other. The scanner array 38 and the other optical components comprised of lenses 42, 44, 46 and prism 48 are mounted as a unit and moved together with uniform motion parallel to the graticule 40 and the document 36. The lens 44, mirror M3 and the graticule 40 act as a shutter to alternately switch the focused image on and off. F is the focal length of the lens 44. Therefore, rays from a point on the graticule 40 pass through lens 44 and become parallel. These parallel rays are reflected back through lens 44 by mirror M3 and refocused again in the plane of the graticule. With the graticule 40 positioned as shown, point E is focused to a point K, point E1 to K1 (etc.). Thus, light passing through the graticule on the left side also passes through on the right. However, as the graticule moves in one direction with respect to the other optical components, the image of the graticule moves in the opposite direction. After a distance L/4 (¼ of the graticule period) is traversed, the graticule openings, $K_i$, will have the dark lines of the graticule, ($D_i$) imaged onto them. Likewise, the openings $E_i$ will be imaged onto the dark lines between the $K_i$. Thus, the "focused-image shutter" is closed. This "focused-image shutter" fully opens again at L/2, 2L/2, 3L/2 .... Lenses 42 and 46 pass light from focal point A, to focal point J, and on to focal point C. Because lens 44 is at a focal point of the document image, it does not have any effect on the image in the thin lens approximation.

The focal length of lens 44 is constrained because of its use in the shutter system, but lenses 42 and 46 may be altered to obtain the necessary size reduction and resolution between document and scanner elements. Actually, J need not be a focal point on the image nor is it absolutely necessary to have lenses at the positions where lenses 42 and 46 are situated. The important constraint is that the optical system of lenses 42 and/or 46, along with lens 44, focuses A to C as desired. The system as drawn is perhaps the simplest conceptually.

The mirror M3 is made partially reflecting with the reflectivity adjusted to provide equal output from the initial reflection and from light which passes through M3, reflects back off mirrors M0, M1, M2 and again passes through M3. We recall that the image of the graticule is converted to parallel rays upon passing through lens 44. The angles $\alpha_1$ and $\alpha_2$ are chosen to tilt these rays so that when refocused through lens 44, the position of graticule image is 180° out of phase with the image reflected off the front of M3. This means that the detector alternately sees light reflected from the surface of M3, (the focused image), and then light which has passed through M3 and is reflected by the prism 48 formed by M0, M1 and M2. This latter image is a defocused image because of the additional pass through the prism 48.

One important factor is to be noted. The tilt from $\alpha_1$, $\alpha_2$ causes a displacement of the center of the (defocused) image spot in the document plane as illustrated at the point B on the document 36 plane. Some displacement is desired because it is necessary to shift a distance L/4 with respect to the graticule/document in order to change the shutter from focused to defocused conditions. The remaining displacement can be compensated for by offsetting the prism 48 by an amount d from the symmetry line. The value of d is dependent upon the size of the prism, which also determines the amount of defocusing, and the path length between the respective lenses and the document. The graticule shutter does not switch instantaneously between focus and defocus images, but varies linearly between the two.

The graticule has a double function of, (1) position increment indicator and, (2) acting as a focus-defocus switch. Because the graticule is not at an image plane of the document, it is not required to be defect-free, and readings are averaged over a large area of the graticule. Also, with the use of a graticule no rapidly moving or oscillating mechanical parts are required.

The partially reflecting mirror M3 could be replaced with a dichroic mirror and the size of the prism 48 minimized so that the scanner array output would alternate between color ranges instead of between focus-defocus images. That is, one might compare visible and infrared differences.

It is to be appreciated that other focus-defocus schemes may be utilized in the practice of the present invention. For example, mechanical movement of the lens or imager may be substituted for the slotted disk or graticule; reflecting disks may be used rather than a slotted disk or graticule, a vibrating mirror in place of the slotted disk or graticule, etc.

Figure 5:
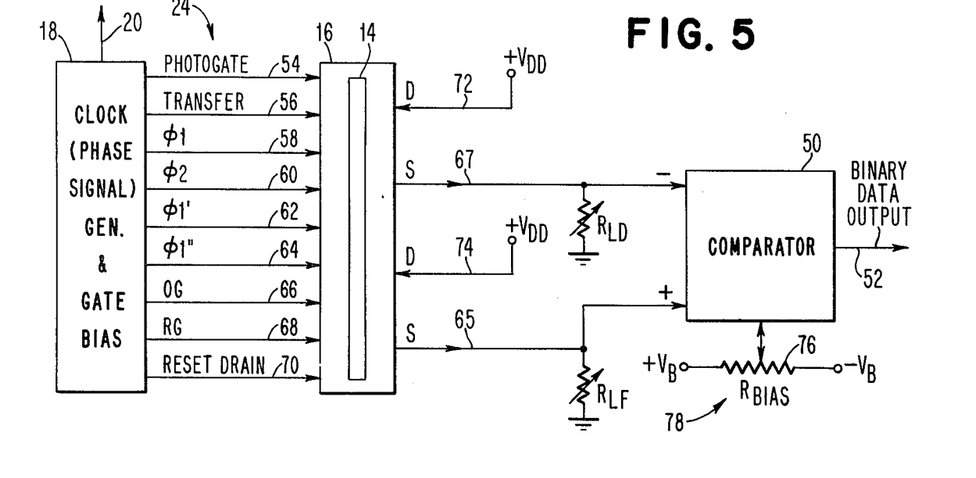
FIG. 5 is a block diagram representation of an image sensing system according to the present invention.

Refer now to FIG. 5 which is a simplified block diagram representation of the system. The scanner chip 16 is illustrated, including the photo element array 14. As previously explained, a timing source 18, such as a clock pulse generator, provides a timing signal on line 20 to the motor 22 for controlling the path length optical changing means 12 (FIG. 1). The line 24 (FIG. 1) is comprised of a plurality of control signal lines connected to the scanner array 16 for controlling the flow of signals therein and to a comparator 50. The comparator 50 provides a binarized data output representative of each successive pel in a line of the image on an output line 52. The photogate array 16 includes a plurality of photo elements, not shown, which have a photogate control signal, which is a constant voltage, applied thereto via a line 54 for permitting alternately focused and defocused images to be sensed by the photogate array 14. A transfer signal is applied at a predetermined time via a line 56 to a transfer gate on the chip 16, not shown, for passing packets of charge, which are indicative of the sensed light signal, to a first shift register, not shown, which is formed on the scanner array 16. In response to the provision of timing signals $\phi1$ and $\phi2$ on lines 58 and 60, the packets of charge are shifted through successive stages of the first shift register and to a gating means such as a diverter, not shown, which is also formed on the chip 16. In response to timing signals $\phi1'$ on line 62, packets of charge indicative of focused data are applied to the gate electrode of a FET, not shown, with the FET converting the charge signal to a voltage signal on a line 65, which is connected to the non-inverting input of the comparator 50. In response to the provision of timing signal $\phi1''$ on line 64, packets of charge indicative of defocused data is shifted into a second shift register, not shown, formed on the chip 16, and in response to the timing signal $\phi1$ and $\phi2$ is shifted through successive stages of the second shift register and are applied to the gate electrode of a second FET, not shown, with the FET converting the charge signal to a voltage signal on a 67 which is connected to the inverting input of the comparator 50. The charge transfer circuits connected to the output FETs described above, have an output gating signal OG provided thereto on line 66 for permitting the movement of signal charge to the gates of the output FETs to provide the output voltage signals on the line 65 and 67, respectively. A reset gate signal RG is provided on a line 68 and a reset drain voltage is provided on a line 70 to reset the output FETs at the end of each comparison cycle. Operational voltage indicated as +VDD is provided via lines 72 and 74 to the drain (D) electrodes of the respective output field effect transistors. The source (S) output connections from the focused and defocused output FETs, respectively, are connected to lines 65 and 67, respectively. The FETs are connected in a source follower mode to output load resistors $R_{LF}$ and $R_{LD}$, respectively. The focused output voltage as previously stated, is connected to the non-inverting input of the comparator 50, and the defocused output is connected to the inverting input. This polarity for the binarized comparator output is directly applicable to a printer which provides a black dot on an output document on the high output bit. The choice of output polarity may be inverted by switching the input connections of the comparator. A bias offset network 78 is provided for controlling the bias level of the comparator 50, and is comprised in one form of a variable resistor 76 and a positive control voltage $(+V_B)$ and a negative control voltage $(-V_B)$. It is to be appreciated that a more complex bias network may be utilized.

One versed in the state of the art will recognize that the use of N channel enhancement mode FETs for the output source followers on the chip and the use of an N channel CCD shift registers results in a negative swing in output voltage for increased light input. This inversion is taken into consideration in the choice of comparator inputs.

Figure 6:
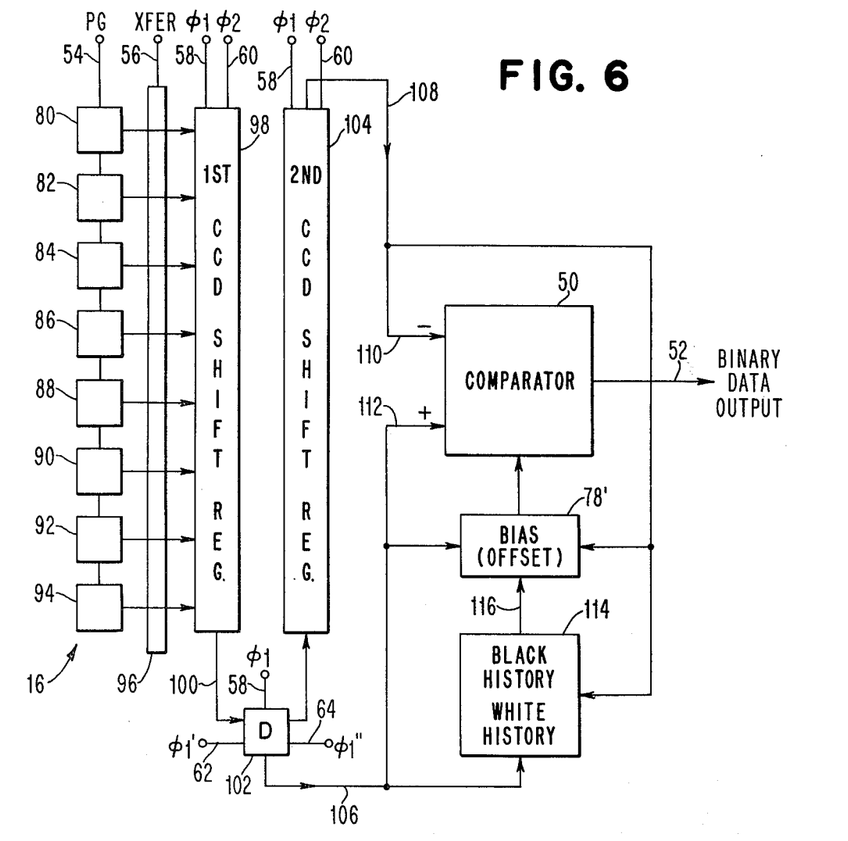
FIG. 6 is a block diagram representation of an image sensing system, according to the present invention.
Figure 7:
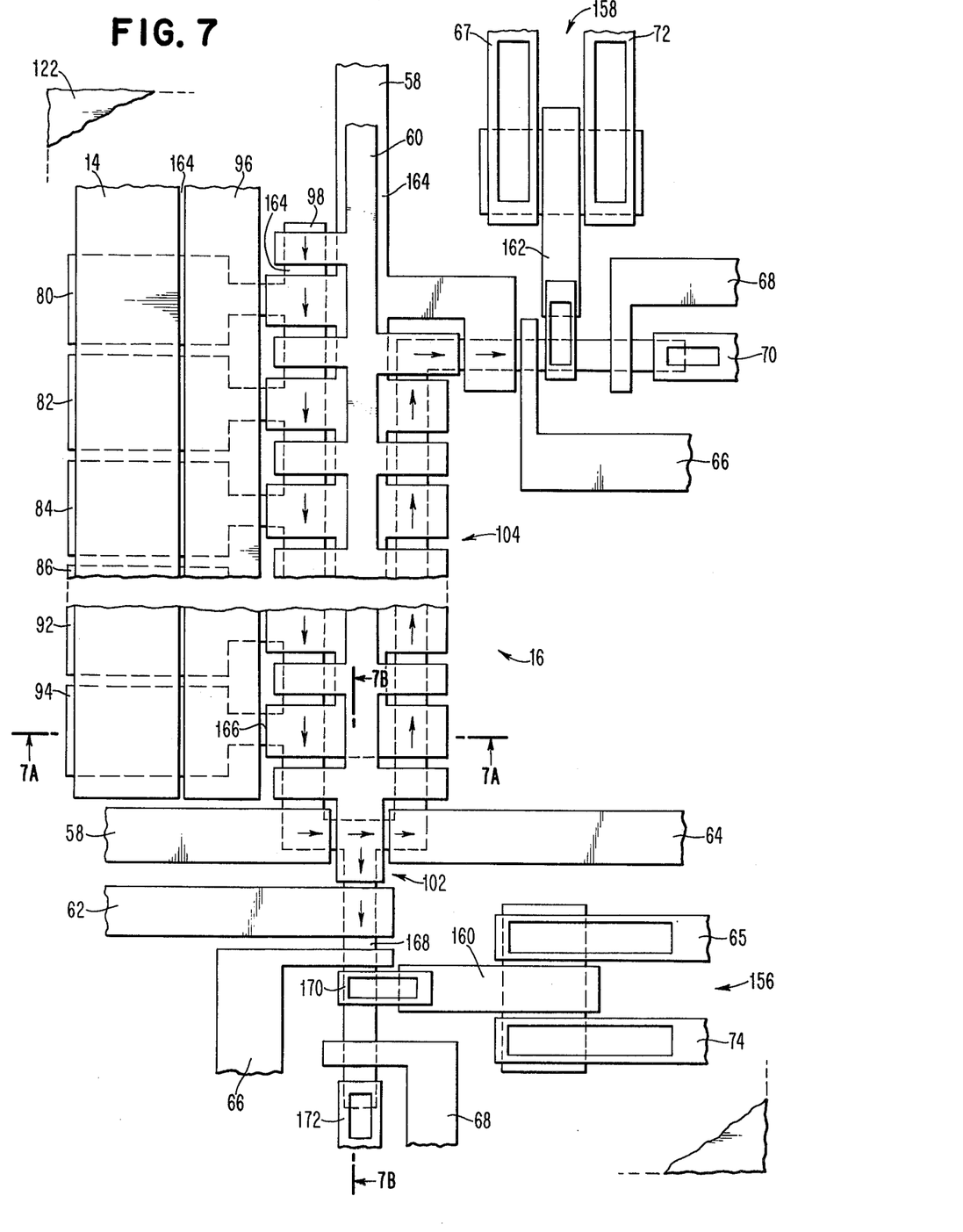
FIG. 7 is a physical layout of the integrated circuit portion of the image scanning system.
Figure 7A:
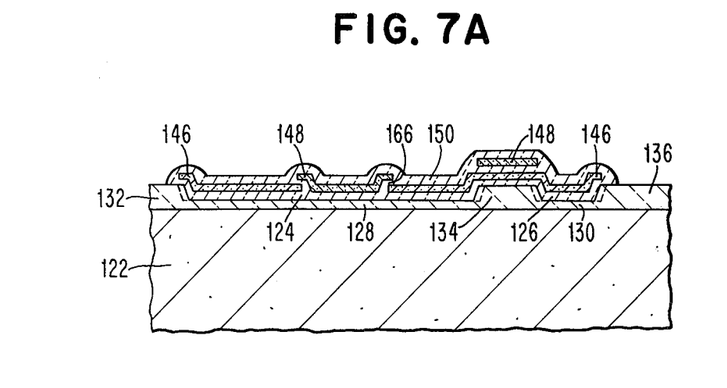
FIGS. 7A and 7B are cross-sections of the integrated circuit of FIG. 7 taken along the lines A—A' and B—B', respectively.
Figure 7B:
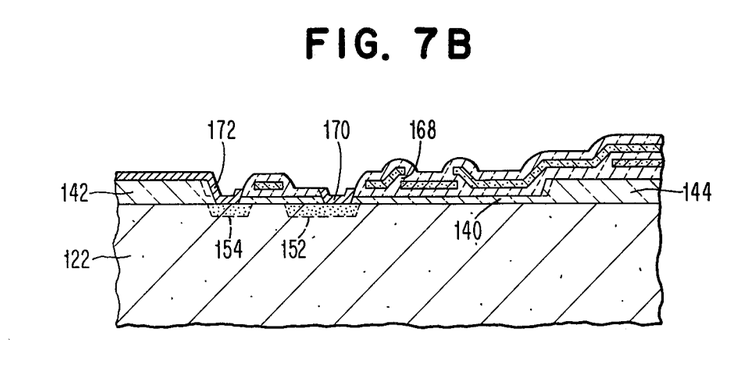
Figure 8A:
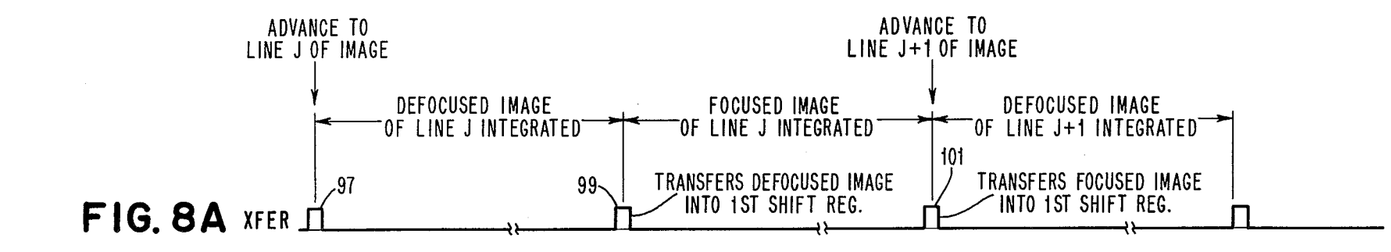
FIG. 8 is a wave shape relationship diagram which is helpful in understanding the operation of the systems illustrated in FIGS. 6 and 7.
Figure 8B:
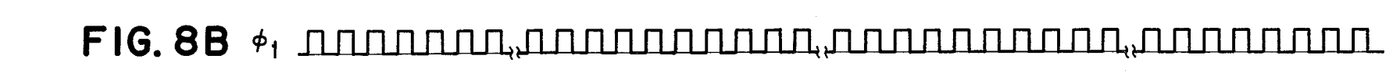
Figure 8C:
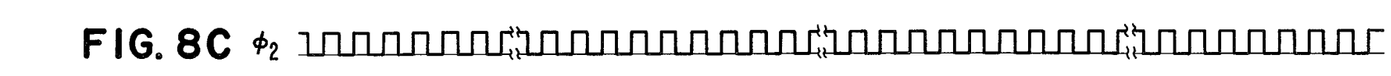
Figure 8D:
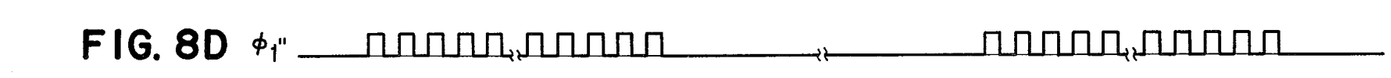
Figure 8E:
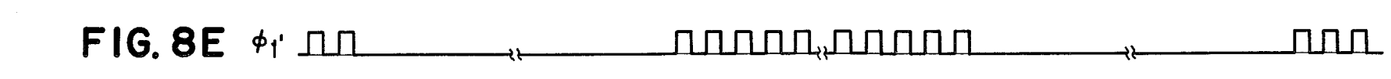
Figure 8F:
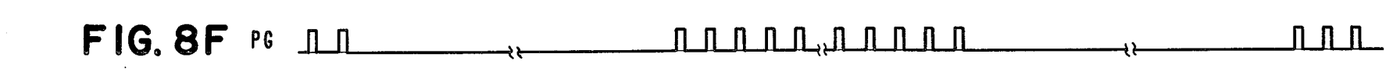
Figures 8G, 8H:
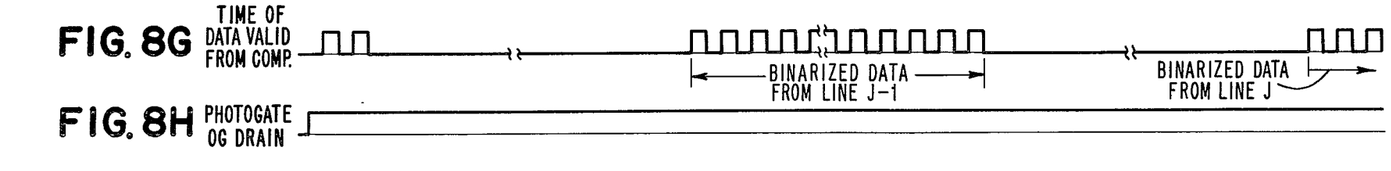

Refer now to FIGS. 6 and 7 which are a block diagram and a physical integrated circuit layout, respectively, of the scanner chip and associated devices. The photo diode array 14 is comprised of photo elements 80, 82, 84, 86, 88, 90, 92 and 94 which are formed on the chip utilizing state of the art integrated circuit fabrication techniques as is clearly indicated on FIGS. 7, 7A and 7B. It is to be appreciated, that in practice a greater number of photo elements are utilized. The state of the art presently allows for on the order of 2000 photo elements to be fabricated on a chip. As the state of the art increases, the number of photo elements that may be utilized on a chip increases accordingly. A photogate voltage is applied via a line 54 to each successive photo element, such that when the respective photo elements sense light, a charge packet is developed in the respective photo elements which, in turn, are applied from the respective outputs thereof to a transfer gate device 96. The gates 96 have transfer voltage pulse, as indicated at 97 in FIG. 8A, applied thereto via a line 56 at preselected times to transfer the respective charge packets to a first shift register 98 which is comprised of charge transfer devices such as CCD devices. The transfer gate pulse is also applied to a document advancing mechanism (not shown) to advance the document so the next line may be subsequently scanned. In response to the provision of $\phi1$ and $\phi2$ pulses on lines 58 and 60, as indicated in FIGS. 8B and 8C, respectively, the packets of charge are transferred from one stage of the first shift register 98 to the next in a well known manner, and in turn therefrom to a first input 100 of a gating device such as a diverter 102 which is formed on the the integrated circuit chip.

Assume, that a defocused image is imaged on the photo elements 14, and the photo generated charge packets corresponding to the respective neighborhood values are integrated at the photogate until this collected charge is transferred as indicated at 99 (FIG. 8A) into the first shift register 98 via the transfer gate 96, as set forth above. At this time of the transfer, the optical path length changing means focuses the image, and the focused pels are integrated until the next transfer pulse 101 (FIG. 8A) at which time the document is advanced to the line J+1, and the image charge information is transferred into the first shift register.

During the integration periods, the charges in the shift registers are being moved into the output so that the first shift register 98 is empty in time for each transfer of charge from the photo elements into the first shift register. As set forth above, the clock pulses $\phi1$ and $\phi2$ (FIGS. 8B and 8C, respectively) advance the charge package along the register in the direction indicated. With two-phase clocks, a built-in assymetry is required to determine the direction of charge motion. With a greater number of phases, the direction of charge flow is controlled by the order in which the phases are clocked. The clocks may have a finite rise and fall time with appropriate overlap as is known in the state of the art.

The defocused charge packets from the first shift register are directed into a second shift register 104 via the diverter 102 when the $\phi1''$ pulses (FIG. 8D) on line 64 are present (FIG. 8B) on line 58. This passes the defocused image charge packets into the second shift register. The focused charge packets are diverted to the output FET for focused data when the $\phi1'$ pulse (FIG. 8E) on line 62 occurs concurrent with the $\phi1$ pulses (FIG. 8B) on line 58. The focused data from the output of the diverter 102 is provided on a line 106, and the defocused data from the second register 104 is provided on a line 108. The defocused image signals are provided to the inverting input 110 of the comparator 50, and the focused signals are provided to the non-inverting input 112 of the comparator 50, with the binarized image output being provided on the output line 52.

A bias offset network 78' and a black history white history network 114 may each receive the focused and defocused signals at respective inputs thereof. The black history, white history device 114 may be comprised of diode-capacitor peak followers which provide a normalization of bias amplitude based on the previous extremes of black/white focused and/or defocused values. In other words, the slope, position, and even the shape of the threshold mapping diagram dividing line might be changed as the document is scanned. Typical threshold mapping diagrams are set forth in FIGS. 9A-9C. The output of the black and white history device is provided via line 116 to the bias offset networks 78', which in turn controls the bias level of the comparator 50.

One limitation of charge transfer devices is the charge transfer inefficiency which, in effect, causes blurring of the image data as the second shift register, the longer path, for the defocused data which is already blurred, the transfer inefficiency problem does not add any additional significant error to the output of the basic imager, that is, the output from the first shaft register.

As previously set forth, FIG. 7 is a schematic showing of the layered structure of a CCD chip that functions as the scanner chip 16. A silicon substrate 122 has a first pattern applied thereto utilizing known techniques such as photolithography to form a channel or device well. The purpose of this structure is to restrict the motion of charge within specific areas of the chip surface. The channels are illustrated in FIG. 7A as channels 124 and 126 which are formed on thin oxide layer 128 and 130, respectively, between thick oxide layers 132, 134 and 136. A channel 138 is also illustrated in FIG. 7B formed on a thin oxide layer 140 between thick oxide layers 142 and 144. The channels may be formed as set forth in "Charge Transfer Devices", hereafter referred to as CTD, by C. H. Sequin and M. F. Tompsett, Academic Press, New York, 1975, on page 43 thereof with reference to FIG. 3.10(b). Other methods of forming channels are illustrated in FIG. 3.10(n) of CTD, with accompanying explanations in the text.

Subsequently, two layers of polysilicon, an amorphous conductive silicon material, are patterned onto the surface of the chip. The first layer is termed poly 1, and the second layer is termed poly 2. Each layer of polysilicon has an oxidized insulating surface coating such as SiO2 applied to the surface thereof. In FIG. 7A the poly 1 and poly 2 layers are illustrated at 146 and 148, respectively, with each being covered by a insulating coating 150.

If a two-phase CCD shift register is used to move the charge packets, a built-in assymetry is required to determine the direction of charge flow. This assymetry is achieved by variation in the thickness of the thin channel oxide or by implanted barriers as described relative to FIG. 3.6 of CTD.

Areas of the thin channel that are not covered by polysilicon are diffused sources and drains for the reset FETs as illustrated at 152 and 154, respectively in FIG. 7B, as well as for output FETs 156 and 158. As previously explained, the FETs 156 and 158 convert the charge packet inputs at their gate electrodes 160 and 162, respectively, to voltages at their source electrodes 64 and 66, respectively.

For clarity, FIG. 7 shows gaps, as at 164, between the poly 1 and poly 2 areas in the photosensor and shift register areas to illustrate the successive layers of the structure. In practice, the poly 1 and poly 2 areas overlap as illustrated at 166 and 168 of FIGS. 7A and 7B, respectively.

With reference to FIG. 7B, contact windows are etched through the thin oxide layer 140 over diffusions 152 and 154, and metal overlays 170 and 172 are applied thereto such that electrical connections may be made to external devices. Contact windows may also be etched in polysilicon where needed.

As previously set forth, the present scanning device provides for the cancellation of dark current and sensitivity variations. In silicon photosensors such as the CCD photogate detector, the CCD with photo diode detector, BBD with photo diode detector and so forth, light creates an electron hole pair. The pair is separated across the depletion region of the device, and either the holes or the electron are collected as an information signal which determines how much light has been integrated in a given photo element. A non-equilibrium condition exists in the photosensor in that thermally generated electron-hole pairs are also included along with the photo generated charges. This leakage current varies from photo element to photo element because of locally occurring defects or variations in the material or construction of the photo elements. At the output of the scanner, there is no way to distinguish between thermal or photon generated charges. A photo element with excessive leakage appears as a bright spot at the corresponding point of the image. This error term is especially important if one is comparing image points with their neighborhoods to calculate the Laplacian in order to determine the adaptive threshold. However, the focus-defocus device set forth in the present invention uses the same photo element to collect the information for a point of the image and for its corresponding neighborhood. That is, the same photo element collects information for the same focused and defocused image point. Thus, when points are compared, that is focused and defocused points, the additional leakage components cancel.

As an example of the dark current cancellation, let us represent the light from the focused image point into the nth cell as $x_f(n)$ and the corresponding charge signal from the CCD output as $y_f(n)$. Let the responsitivity, or photon-to-charge conversion efficiency of the nth cell be $a(n)$ and the leakage of that cell is $b(n)$. The output from the focused image shift register on line 106 is:

$$y_f(n) = [a(n)][x_f(n)] + b(n) \quad (1)$$

The defocused image values $x_d(n)$ are subject to the same responsivity terms $a(n)$, and the same leakage terms $b(n)$ because the neighborhoods, or defocused values, are collected in the same photoelements at their respective focused image points. However, the defocused values are all transferred to the second shift register 104 and therein pick up some amount of leakage during the time that they are in the second shift register. Because each defocused signal passes completely through the second shift register, and therefore remains in the second shift register for equal amounts of time, this leakage current has a value c added to all outputs independent of the input point n. The leakage from the first shift register is included in the n-dependent values $b(n)$ which are added to both focused and defocused outputs.

Thus, the output of the defocused shift register 104 on line 108 is given by:

$$y_d(n) = (a(n))(x_d(n)) + b(n) + c \qquad (2)$$

Because the term c does not vary, it may be cancelled by the bias input to the comparator 50 from bias network 78'. The difference between the sensed focused and defocused images is:

$$y_f(n) - y_d(n) = a(n)[x_f(n) - x_d(n)] \qquad (3)$$

Therefore, if the focused image point is greater (brighter) than its neighborhood (defocused image value), then:

$$[x_f(n) - x_d(n)] > 0, \qquad (4)$$

and since a(n) is positive, we obtain $$[y_f(n) - y_d(n)] > 0 \qquad (5)$$

independently of the b(n) leakage values. Both differences are less than 0 for an image point darker than its neighborhood. This inherent cancellation feature eliminates the need for compensation of the leakage based on some type of memory to determine the amount of error b(n) in each output signal. Thus, we have determined if the imaged pel is brighter than its neighborhood defocused value in spite of the dark current and sensitivity variations of the system. Stated another way, we have derived an adaptive threshold (the neighborhood value) which determines if the binarized output is white or black. For our example, a binary zero, that is a white output is provided if $y_f(n) > y_d(n)$, and we provide a binary 1 output, that is, a black output if $y_f(n) < y_d(n)$. For the condition of equality the output is indeterminate and may either be black or white.

Figure 9A:
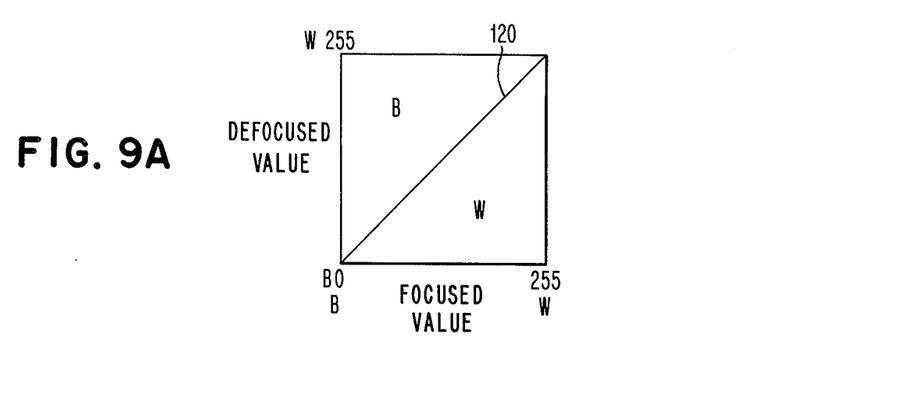
FIGS. 9A–9C are threshold mapping diagrams which illustrate alternative ways of biasing the output comparator illustrated in FIGS. 5 and 6.

In FIG. 5, the comparator 50 is illustrated as having a fixed bias voltage applied thereto from the biasing network 78. In FIG. 6, a biasing network 78' is illustrated, which provides a variable bias to the comparator based on present focused and defocused signal inputs, and a black history, white history input which is dependent on previous focused and defocused data inputs. The fixed bias voltage may be used to cancel the constant dark current term c discussed above. This results in a threshold mapping diagram, as illustrated in FIG. 9A. The diagram has an abscissa given by the focused value which ranges from 0 for absolute black to 255 for saturated white. Similarly, the ordinate provides the defocused value of the current pel under consideration. The output state of the comparator is chosen to be white (W) if the focused value is greater than the defocused value, and black (B) if the focused value is less than the defocused white. If the values are equal, the output of the comparator is indeterminate and may be either black or white. The regions of ordinate-abscissa pairs which result in black outputs and white outputs are indicated by the respective letters B and W on either side of the dividing line 120 which determines the threshold value. This fixed bias voltage representation is the simplest form of biasing network, with the fixed bias being independent of the focused and defocused values and of the past B/W history.

Figure 9B:
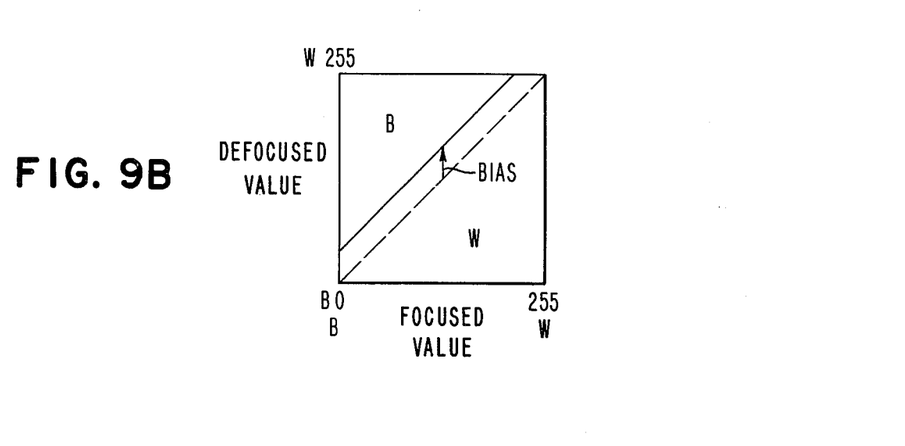

For some applications it may be desirable to increase the bias offset as illustrated in FIG. 9B. Here the bias is offset in favor of white decisions. This is useful in applications such as optical character recognition (OCR) in which one wishes to have the isolated lines comprising characters output as black, and larger uniform areas as white. This eliminates gradual variations in grey background levels. Large uniform areas of the image will have essentially equal image point and neighborhood values. As shown in FIG. 9A, the B/W decisions will be highly sensitive to paper noise, dirt, fly specks, etc. The additional bias as illustrated in FIG. 9B, forces these nominally uniform areas to white.

Figure 9C:
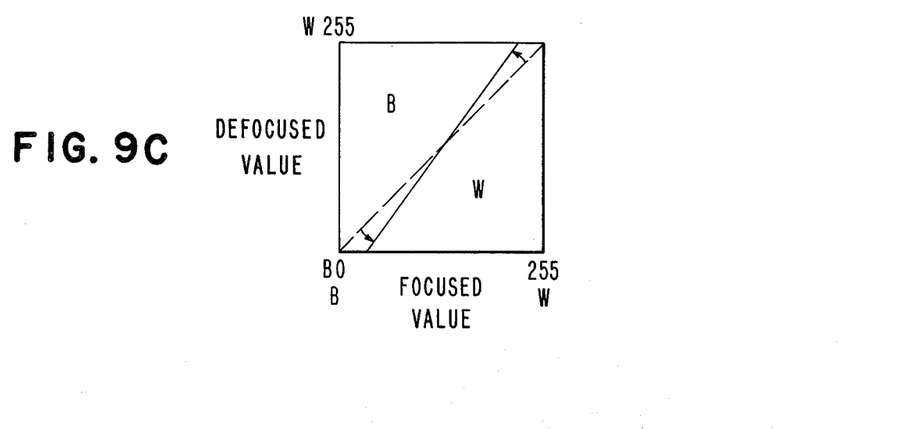

For facsimile applications in which large uniform dark areas should be represented as black, the biasing threshold mapping diagram as illustrated in FIG. 9C is more appropriate. In this diagram, the bias is linearly proportional to the current focused image value. Darker areas are biased towards a black decision, and brighter areas are biased towards a white decision. Edges of characters and other boundaries of the image will still have the appropriate B/W transition. Control for such B/W decisions is implemented by the use of a bias network 78' and history device 114 as illustrated in FIG. 7. In other words, the slope, position, and even the shape of the threshold diagram dividing line may be changed as the document is scanned.

The advantage of using the focused-defocused operation on a line-by-line basis rather than an element-by-element basis derives from the ability of the CCD scanner to integrate the image photoelectrons for the duration of an entire line scan. This increases the sensitivity of the scanner and reduces the amount of illumination required for a given page scan rate. Furthermore, the image needs to be switched from focused to defocused condition and back again only once per line, not once per every picture element. Accordingly, the mechanical components of the scanner may operate at a lower speed.

Including the photo-sensitive elements, the first analog shift register, the diverter, and the second analog shift register on a single chip using CCD techniques provides advantages over other alternatives. There is improved accuracy because the signal is maintained in the form of discrete packets of charge, which packets are conserved as the charge is moved about the chip. If the charge is taken out of one shift register and off the chip through a charge to voltage conversion and then back into a second shift register chip via a voltage to charge conversion, as is done in the prior art, then the data in the second shift register is subjected to non-linearities in the conversion processes thereby creating discrepancies with respect to the data output directly from the first shift register. The non-linearity problem may be bypassed by using an analog-to-digital (A/D) converter to take the data from the first register and transform it into digital, e.g., byte per pel, storing the defocused data in a digital buffer, and comparing the focused and defocused images in digital fashion. This digital method introduces cost and speed problems with currently available A/D converters.

It is seen therefore, that the described scanner array provides a compact, and relatively inexpensive device which cancels dark current and sensitivity variations, which variations are not cancelled in the presently known scanning devices.

What is claimed is:

1. Apparatus for binarizing a scanned image having n, where n is an integer, lines of elements, comprising:
   means for imaging a line at a time of elements in said image onto a line of light responsive charge transfer elements, with said charge transfer elements each producing a packet of charge comprised of photogenerated charge and thermally generated charge;

means for alternately changing the effective optical path length of each imaged line of elements between two values for alternately focusing and defocusing each line of elements of said image on said light responsive charge transfer elements;

a first charge transfer gating means for receiving in parallel said charge packets indicative of each alternately focused and defocused line of imaged elements from said light responsive charge transfer elements;

a first charge transfer shift register which has said charge packets indicative of each focused and defocused line of imaged elements alternately gated therein in parallel at a predetermined time from said first charge transfer gating means;

a second charge transfer gating means for receiving said charge packets indicative of each alternately focused and defocused line of imaged elements from said first charge transfer shift register, with said second charge transfer gating means providing said charge packets indicative of each focused line of imaged elements at a first output, and each defocused line of imaged elements at a second output;

a second charge transfer shift register which receives one of said charge packets indicative of each focused and defocused line of imaged elements from either the first or the second output, respectively, of said second charge transfer gating means;

means for converting said charge packets indicative of each focused and defocused line of imaged elements at one of the first and second outputs of said second charge transfer gating means and the output of said second shift register, respectively, to a first and a second voltage, respectively; and a comparator having a first input to which said first voltage is applied and a second input to which said second voltage is applied and having an output, with said comparator substantially cancelling the components of voltage in said first and second voltages which are produced by said thermally generated charge, and with said comparator providing a binarized signal at the output produced by the difference between the components of voltage in said first and second voltages produced by said photongenerated charge.

2. The combination claimed in claim 1, wherein said means for alternately changing the effective optical path length of each imaged line of elements comprises a graticule shutter system which varies linearly between a focus and defocus condition.

3. An integrated scanner chip comprising:

a line of m, where m is an integer, charge transfer device light responsive elements formed on said chip;

a charge transfer device gates formed on said chip, each gate having an input connected to a respective one of said light responsive elements, and each gate having a control input and an output;

a first charge transfer device shift register having m stages formed on said chip, with each stage having an input, an output, and at least one control input with the input of each stage being connected to the output of a respective one of said gates;

a charge transfer device diverter formed on said chip having an input connected to the output of one of said n stages of said first shift register, with said diverter including at least two control inputs and two outputs;

a second charge transfer device shift register having m stages formed on said chip, with each stage having an input, an output, and at least one control input, with the input of the first stage being connected to the second output of said diverter;

first and second field effect transistors formed on said chip, with the gate electrode of the first transistor being connected to the first output of said diverter, and the gate electrode of the second transistor being connected to the output of the mth stage of said second shift register; and a comparator formed on said chip having a first input connected to one of the source and drain electrodes of said first transistor, and a second input connected to one of the source and drain electrodes of said second transistor, with said comparator including an output.

* * * * *